United States Patent [19]
Blum

[11] Patent Number: 5,141,678
[45] Date of Patent: Aug. 25, 1992

[54] METHOD FOR FORMING DISPOSABLE MOLDS FOR PRODUCING OPTICAL QUALITY LENSES

[76] Inventor: Ronald D. Blum, 5320 Silver Fox Rd., Roanoke, Va. 24014

[21] Appl. No.: 594,135

[22] Filed: Oct. 10, 1990

[51] Int. Cl.$^5$ .............................................. B29D 11/00
[52] U.S. Cl. ..................................... 264/1.7; 264/1.8; 264/2.5; 264/2.7; 425/808
[58] Field of Search .................. 264/1.4, 1.7, 2.5, 2.7, 264/1.8; 425/808; 219/121.69, 121.85

[56] References Cited

U.S. PATENT DOCUMENTS

| | | | |
|---|---|---|---|
| 2,304,663 | 12/1942 | Smith et al. | 425/808 |
| 2,333,051 | 10/1943 | Smith | 425/808 |
| 2,339,433 | 1/1944 | Staehle | 264/1.7 |
| 2,361,589 | 10/1944 | Bennett | 425/808 |
| 3,248,460 | 4/1966 | Naujokas | 264/1.7 |
| 3,422,168 | 1/1969 | Bowser | 425/808 |
| 3,423,488 | 1/1969 | Bowser | 264/2.5 |
| 3,460,928 | 8/1969 | Casko | 425/808 |
| 3,830,460 | 8/1974 | Beattie | 425/808 |
| 3,931,373 | 1/1976 | Beattie | 264/2.5 |
| 3,946,982 | 3/1976 | Calkins et al. | 425/808 |
| 4,018,587 | 4/1977 | Maitenaz | 65/17 |
| 4,061,518 | 12/1977 | Burroughs et al. | 264/2.5 |
| 4,095,772 | 6/1978 | Weber | 425/808 |
| 4,163,541 | 8/1979 | Campbell | 425/808 |
| 4,163,655 | 8/1979 | Campbell | 425/808 |
| 4,190,621 | 2/1980 | Greshes | 425/808 |
| 4,227,950 | 10/1980 | Spycher | 264/1.7 |
| 4,279,401 | 7/1981 | Ramirez et al. | 264/2.5 |
| 4,434,113 | 2/1984 | Neefe | 264/25 |
| 4,474,355 | 10/1984 | Greshes | 425/808 |
| 4,522,768 | 6/1985 | Roscrow et al. | 264/2.2 |
| 4,578,230 | 3/1986 | Neefe | 264/2.5 |

FOREIGN PATENT DOCUMENTS

| | | | |
|---|---|---|---|
| 347043 | 12/1989 | European Pat. Off. | 264/2.5 |
| 8911966 | 12/1989 | World Int. Prop. O. | 264/2.5 |

*Primary Examiner*—James Lowe
*Attorney, Agent, or Firm*—Kenyon & Kenyon

[57] ABSTRACT

A fast, simple and relatively inexpensive method for forming disposable molds for use in casting optical quality lenses. A method of producing a disposable mold having a casting surface is disclosed which comprises providing a base master having a first contacting surface; providing a casting surface master having a second contacting surface having a shape corresponding to the shape of the casting surface; providing a resin composition; contacting the base master and the casting surface master such that the first and second contacting surfaces form a cavity enclosing the resin composition, wherein the cavity is shaped to correspond to the shape of the disposable mold; and curing the resin composition to form the disposable mold.

6 Claims, 1 Drawing Sheet

METHOD FOR FORMING DISPOSABLE MOLDS FOR PRODUCING OPTICAL QUALITY LENSES

FIELD OF THE INVENTION

The present invention relates to methods for quickly and inexpensively producing molds for making plastic optical quality lenses, preferably spectacle lenses.

BACKGROUND OF THE INVENTION

In manufacturing lenses, and particularly lenses for use with eye glasses, the use of plastic is often desirable due to its weight and durability. Normally in manufacturing plastic lenses, two molds in conjunction with a gasket are sealed in a spaced relationship to provide a mold cavity therebetween. This mold cavity ultimately forms the shape, curvature, thickness and configuration of the product lens. Resin material is dispensed into the mold cavity and cured to harden the lens with the exterior surfaces being configured to a particular patient's prescription.

The mold forms which actually constitute the mold have been in the past made of metal or glass which are ground or formed to the desired shape to create the prescription and made by the optometrist, ophthalmologist or optician. Utilizing molds made of metal or glass for this purpose is an expensive proposition for both the manufacturer and the user. Whether glass or metal is used it is initially cast and then ground to the desired configuration. A number of different configurations are required to ensure that the desired prescription can be made from these expensive mold forms. These types of molds have produced economic and manufacturing impediments to using certain casting processes in many facilities.

Sets of mold forms which will allow casting of a wide range of prescriptions are very expensive, costing in many instances more than $200 per mold. Progressive molds are even more expensive. Entire sets of molds can cost tens of thousands of dollars. Moreover, each time a new lens size or style is introduced an entire new set of molds must be purchased. As a result, keeping an inventory of conventional molds presents a significant component of overhead for an optical casting lab and has limited the success of in-office casting.

It would, therefore, be beneficial to provide a method for making molds for optical quality lenses, preferably spectacle lenses, which is both convenient and economical, such that a wide range of molds can be inexpensively produced. To date no such disposable lens mold is commercially available in the optical industry.

SUMMARY OF THE INVENTION

The present invention relates to a fast, simpler and relatively inexpensive method for forming disposable molds for use in casting optical quality lenses. A method of producing a disposable mold having a casting surface is disclosed which comprises providing a base master having a first contacting surface; providing a casting surface master having a second contacting surface having a shape corresponding to the shape of the casting surface; providing a resin composition; contacting the base master and the casting surface master such that the first and second contacting surfaces form a cavity enclosing the resin composition, wherein the cavity is shaped to correspond to the shape of the disposable mold; and curing the resin composition to form the disposable mold.

In another embodiment, a method of producing a disposable mold having a casting surface is disclosed which comprises providing a resin composition; providing a base master having a first contacting surface made of a material which will bond to the resin composition upon curing; providing a casting surface master having a second contacting surface having a shape corresponding to the shape of the casting surface; contacting the base master and the casting surface master such that the first and second contacting surfaces form a cavity enclosing the resin composition, wherein the cavity is shaped to correspond to the shape of the disposable mold; and curing the resin composition to form the mold; wherein the base master is incorporated into the disposable mold.

These and other methods in accordance with the present invention allow production of disposable molds very inexpensively and in a wide variety of configurations. Since the resultant molds are made of relatively inexpensive cured monomer materials, they can be used numerous times and then thrown away (i.e., they are disposable). Changes in style and size can easily be accommodated by making only minor changes in the masters used in the mold production process. As a result, entire new sets of molds can be produced for hundreds rather than tens of thousands of dollars. The disposable molds made in accordance with the present invention can also be pre-edged into the desired lens shape such that lenses cast therefrom will require less edging. Since the molds made according to the present invention are made of a disposable material, they can be ground or edged as desired and then discarded. Various other advantages of the methods of the present invention and lenses made thereby will be evident from the detailed description of certain embodiments below.

The relative thickness of various components is greatly exaggerated in the Figures for the purpose of illustration.

DETAILED DESCRIPTION OF THE INVENTION

Figure 1:
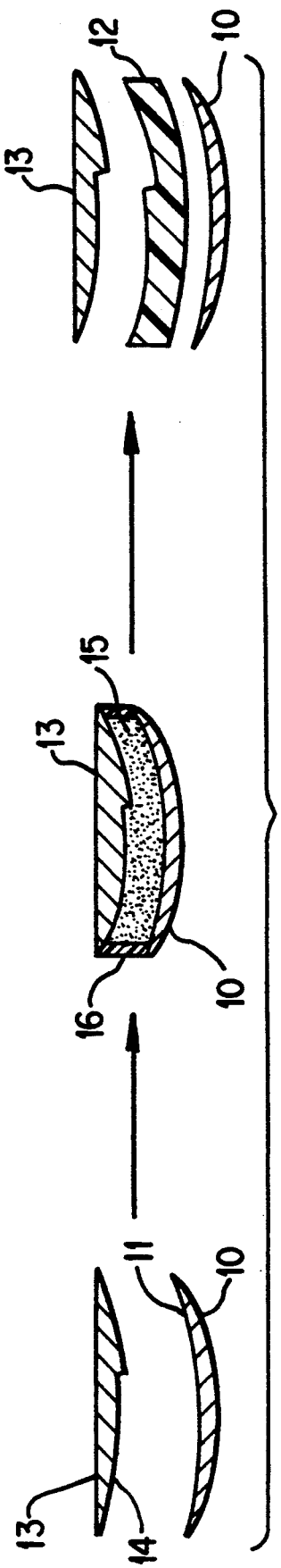
FIGS. 1 and 2 are cross-sections of assemblies for producing disposable molds in accordance with the present invention.

With reference to FIG. 1, disposable molds can be made in accordance with the present invention as follows. A base master 10 is provided to form the lower surface of the disposable mold. Contacting surface 11 can take whatever shape is desired for the surface of the resulting mold 12 which will not be used for casting. In FIG. 1, base master 10 is shown as curved, but any other form is suitable. In some embodiments, base master 10 may be flat to allow the resulting mold 12 to sit flat on a surface during use. Base master 10 can be made of any material, including materials which will bond with the monomer material used to form resulting mold 12. If a material is used which will bond to the monomer material, the base master will be incorporated into and form a part of the resulting mold. In certain embodiments the base master may already bear the virtual shape of the desired mold, such that the casting procedure of the present invention casts only a thin film over the surface of the master to provide an optical quality transmitting surface to the resulting mold.

Preferably contacting surface 11 is made of glass, electroformed nickel or a hardcoated plastic material. The body of base master 10 can be made of a material different from contacting surface 11.

A casting surface master 13 is also provided. Contacting surface 14 of casting surface master 13 corresponds to the shape of the surface of resulting mold 12 which will be used for casting. Therefore, contacting surface 14 will correspond to the curvature, optical segment, etc. of the resulting lens which will be cast using resulting mold 12. The body of casting surface master 13 can be made of any material; however, contacting surface 14 must be made of a material which will produced an optical quality surface and will not bond with the monomer used to form the resulting mold. Preferably, contacting surface 14 is and/or the body of casting surface master 13 is made of glass, electroformed nickel or hardcoated plastic material. In certain preferred embodiments, the casting surface master is a prescription lens, such as a glass lens, a hardcoated CR-39 lens, or a hardcoated polycarbonate lens.

To form resulting mold 12, resin 15 is placed onto base master 10. The resin can be any type of material that will transfer an optical quality surface ("optical quality surface-transmitting resins") when used as a mold. Suitable materials include without limitation those commonly used to cast plastic lenses (such as CR-39, an allyl diglycol carbonate resin), hard coat resins, inherently scratch resistance resins, anti-reflective resins, photosensitive resins and the like. Spacers 16 (which provide the desired overall thickness of the resulting mold) are placed around the periphery of base master 10. Alternatively, a spacing and sealing gasket or an o-ring can be used instead of spacers. In other alternative embodiments, depending on the shape of contacting surface 14, no spacers, gaskets or o-rings are used. Casting surface master 13 is then placed on top of resin 15 such that its weight compresses the resin to the thickness specified by the spacers or the thickness of a thin film resulting from capillary action.

The resin is then cured by UV, heat a combination thereof, or other curing means (preferably UV). Base master 10 and casting surface master 13 are separated to provide raw resulting mold 12. The raw mold is then covered with a hardcoat or other surface coating which will transmit an optical quality surface and will prevent the surface of the resulting mold from bonding with resin materials used for casting a lens with the resulting mold. Appropriate materials and methods for providing such coatings are known in the art. A coating surface could also be provided by recasting a thin layer of coating material on the surface of the raw resulting mold in a manner similar to that previously described to provide surface protection of the mold, to create a non-bonding barrier for contact with the lens-forming material, and to correct any imperfections int he optical surface defined and transmitted by the mold casting surface. The coated resulting mold can then be sued as any other mold in casting processes.

Figure 2:
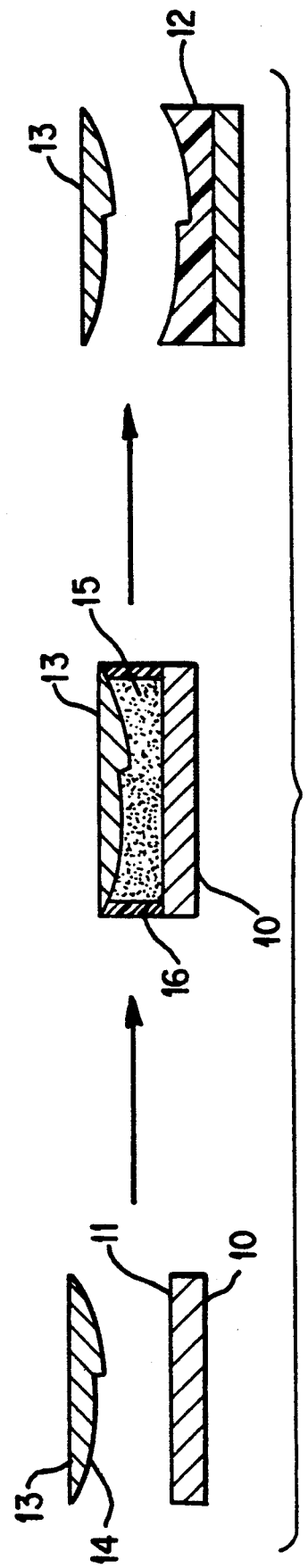

FIG. 2 depicts another embodiment of the invention in which the base master is incorporated into the final resulting mold. In such embodiment the base master 10 is made from a material that will adhere to the resin material (such as injection molded plastic, compression molded plastic or stamped plastic). This base master is then used as previously described. When the resin is cured, however, it bonds to the surface of the base master and produces a resulting mold incorporating the base master material. The cured resin surface is then coated as previously described to provide the finished resulting mold.

The resin material may be cured in any manner appropriate to the composition of such material. Most materials can be cured by exposure to heat or ultraviolet radiation ("UV"). Other curing methods may include without limitation ultrasound, infrared, microwave and other forms of radiation. Thermal initiators (such as diisopropyl peroxydicarbonate) and/or UV initiators (such as 2-hydroxy-2-methyl-1-phenyl-propan-1-one or 1-hydroxycyclohexylphenyl ketone) are mixed with the resin material before it is used.

Suitable UV light sources include those manufactured by Phillips Corporation and identified as TL/10R/UVA reflector lamps, HPM high pressure halide lamps, HPA medium pressure metal halide lamps and HPR high pressure mercury vapor lamps. In preferred embodiments, the UV source (300-450 nm) is applied during the curing process until the resin hardens sufficiently (approximately 5-30 minutes). In some cases, the molds to be cured are placed onto a turntable for rotating the lenses through the stream of incident radiation in order to achieve more even curing and maximizing the number of lenses which can be cast within a given area. Other appropriate UV light sources and conditions for exposure will depend upon the resin composition employed and will be apparent to those skilled in the art.

Heat or UV, or both, may be applied by any means appropriate to the material from which the mold and preformed lens are made. Unlike thermal curing, UV curing requires at least one UV transparent surface through which the UV radiation can travel to reach the resin monomer material. Upon application of heat, UV or both, the initiators cause the optical resin material to polymerize and to bond to the surface of the preformed lens.

Some materials can be cured by a combination of heat and UV applied sequentially or simultaneously. For example, applicant's co-pending application Ser. No. 190,856, filed May 6, 1988, and now U.S. Pat. No. 4,919,850, which is incorporated herein by reference, discloses a resin material and means for curing such material using both heat and UV. Such material includes a liquid monomer, a thermal initiator, plus a photosensitive ultraviolet initiator. In this process, the liquid monomer lens resin material is placed into the desired master combination (with a gasket, if necessary or desired) and subjected to thermal curing using a heated fluid bath (preferably 150°-180° F.) for a short period of time, less than ten (10) minutes. The heat activates the thermal initiator and forms the lens material mixture into a gel which freezes the photosensitive initiator in place throughout the lens material. Furthermore, this gelled state preestablishes the optical framework needed for an optical lens relatively free of optical distortion or imperfections. After the lens material mixture has sufficiently gelled, it is then subjected to ultraviolet light to activate the photosensitive initiator and complete the polymerization or curing process to form the finished lens.

Preferred resin compositions for use with such a combined thermal/UV curing process comprises resin monomer (such as CR-39), 0.5-5.0% by weight thermal initiator (such as diisopropyl peroxydicarbonate), and 1-8% by volume photosensitive initiator (such as 2-hydroxy-2-methyl-phenyl-propan-1-one or 1-hydroxycyclohexylphenyl ketone, which are sensitive to ultraviolet light).

In certain instances it may be desirable to recast the casting surface of the resulting mold in order to correct any imperfections in the casting surface. When recasting is employed, the resulting mold is used much as the base master was used in the initial mold casting process. However, no gaskets, spacers or o-rings are employed. Thus, the weight of the casting surface master compresses the resin to a very thin capillary layer which fills in any imperfections. The resin is then cured as usual. Recasting could be combined with the hardcoating process by recasting the resulting mold with a hardcoat material or an inherently scratch resistant material.

Resulting molds can also be used to transfer coatings to lenses made using the resulting molds. Coatings for transfer (such as anti-scratch, anti-reflective, photosensitive, tint, etc.) can be recast onto the surface of the resulting mold. When the coated resulting mold is used to cast a lens, the coating will be transferred to and become a part of the lens as long as the coating material has a greater affinity for the lens material than the material of the casting surface of the resulting mold. Masters can also be coated the materials that will be transferred to the resulting mold upon casting. Proper selection of coating or resin materials enables one to coat a master, transfer the coating to a mold, and then in turn transfer that same coating to a lens cast using such mold. Suitable methods and materials for achieving such transfers are known in the art, including without limitation those described in U.S. Pat. Nos. 4,758,448 and 4,544,572.

Resulting molds produced as described can also be made or edged into the shape desired for final lens shapes. These "pre-edged" molds can be used with pre-edged preformed lenses in accordance with the present invention to produce a resulting lens of the desired final shape without much flashing or additional edging which is ready for mounting after the casting process without need for additional edging.

Molds can be made in accordance with the present invention from any material which can be cast as described. Such materials include without limitation resin mixtures containing allyl diglycol carbonates (such as "MasterCast 1" and "MasterCast 2" which are trademarks of Vision Sciences, Monrovia, Calif.; and "CR-39" which is a trademark of PPG Industries), allylic esters such as triallyl cyanurate, triallyl phosphate, triallyl citrate, diallyphenyl phosphonate, acrylic esters, acrylates, methyl, allyl and butyl methacrylates, polycarbonates, styrenics, lexan, polyesters such as those formed of ethylene glycol maleate, and other liquid monomer/polymer materials having high indices of refraction (such as HIRI ™ high refractive index resin which is a trademark of PPG Industries).

Certain materials used to "hardcoat" molds (such as those described in U.S. Pat. Nos. 4,758,448 and 4,544,572, which are incorporated herein by reference) can also be used as the resin material, thus providing a durable surface to the mold cast in accordance with the present invention. Hardcoat materials can also be blended with other resins for use in practicing the present invention. Furthermore, the resulting mold can be a composite of high index plastic materials and more scratch resistant materials.

Casting surface masters can be made from any material which will provide an optical quality surface when used for casting, such as Crown glass, electroformed nickel or hardcoat plastics. Means for making appropriate molds and for fashioning such molds for use in accordance with the present invention are known in the art.

The above has been a detailed discussion of certain embodiments of the present invention. They should not be considered so as to limit the scope of applicant's invention which is defined by the appended claims.

What is claimed is:

1. A method of producing a disposable mold for use in manufacturing optical quality spectacle lenses, said mold having a casting surface and an opposing surface, comprising:

providing a resin composition;

providing a base master having a first contacting surface made of a material which will bond to said resin composition upon curing;

providing a casting surface master having a second contacting surface having a shape corresponding to the shape of said casting surface;

contacting said base master and said casting surface master such that said first and second contacting surfaces form a cavity enclosing said resin composition, wherein said cavity is shaped to correspond to the shape of said disposable mold; and curing said resin composition to form said disposable mold;

wherein said casting surface is of optical quality and said opposing surface is of less than optical quality and wherein said base master is incorporated into said mold; and coating said casting surface with a material that is transferable to a lens cast using said mold.

2. A method of producing a disposable mold for use in manufacturing optical quality spectacle lenses, said mold having a casting surface and an opposing surface, comprising:

providing a resin composition;

providing a base master having a first contacting surface made of a material which will bond to said resin composition upon curing;

providing a casting surface master having a second contact surface having a shape corresponding to the shape of said casting surface;

coating said casting surface master with a transferable material which is transferred to said casting surface of said mold;

contacting said base master and said casting surface master such that said first and second contacting surfaces form a cavity enclosing said resin composition, wherein said cavity is shaped to correspond to the shape of said mold; and curing said resin composition to form said mold;

wherein said casting surface is optical quality and said opposing surface is of less than optical quality and wherein said base master is incorporated into said mold.

3. The method of claim 2 wherein said transferable material is capable of further transfer from said casting surface of said mold to the surface of a lens cast with said mold.

4. A method of producing a disposable mold for use in manufacturing optical quality spectacle lenses, said mold having a casting surface and an opposing surface, comprising;

providing a resin composition;

providing a base master having a first contacting surface made of a material which will bond to said resin composition upon curing;

providing a casting surface master having a second contacting surface having a shape corresponding to the shape of said casting surface;

contacting said base master and said casting surface master such that said first and second contacting surfaces form a cavity enclosing said resin composition, wherein said cavity is shaped to correspond to the shape of said mold; and curing said resin composition to form said mold; wherein said casting surface is of optical quality and said opposing surface is of less than optical quality and wherein said base master is incorporated into said mold; and casting said lens using said mold.

5. The method of claim 4 wherein the casting surface of said mold is coated with a material which transfers to said lens.

6. The method of claim 4 wherein said mold is pre-edged to the desired shape of said lens prior to use of said mold to form said lens.

* * * * *